(12) United States Patent
Ismail et al.

(10) Patent No.: US 9,784,195 B2
(45) Date of Patent: Oct. 10, 2017

(54) CONTINUOUS ADAPTATION OF AN INTAKE OXYGEN SENSOR FOR PRESSURE, HUMIDITY AND AGING

(71) Applicants: Ayman M Ismail, Westland, MI (US); Ethan E Bayer, Lake Orion, MI (US); John R Bucknell, Royal Oak, MI (US)

(72) Inventors: Ayman M Ismail, Westland, MI (US); Ethan E Bayer, Lake Orion, MI (US); John R Bucknell, Royal Oak, MI (US)

(73) Assignee: FCA US LLC, Auburn Hills, MI (US)

( * ) Notice: Subject to any disclaimer, the term of this patent is extended or adjusted under 35 U.S.C. 154(b) by 107 days.

(21) Appl. No.: 14/834,719

(22) Filed: Aug. 25, 2015

(65) Prior Publication Data
US 2016/0061151 A1  Mar. 3, 2016

Related U.S. Application Data

(60) Provisional application No. 62/043,180, filed on Aug. 28, 2014.

(51) Int. Cl.
| F02D 41/00 | (2006.01) |
| F02D 41/14 | (2006.01) |
| F02D 41/24 | (2006.01) |
| F02M 26/46 | (2016.01) |

(52) U.S. Cl.
CPC ..... *F02D 41/0055* (2013.01); *F02D 41/0052* (2013.01); *F02D 41/2454* (2013.01); *F02D 41/2474* (2013.01); *F02M 26/46* (2016.02); F02D 2041/1472 (2013.01); F02D 2200/0418 (2013.01); Y02T 10/47 (2013.01)

(58) Field of Classification Search
CPC ......... F02M 25/0755; F02M 2026/001; F02M 2026/003; F02M 26/45; F02M 26/46; F02D 41/1454; F02D 41/007; F02D 41/0052; F02D 41/0055; F02D 41/2474; F02D 41/144; F02D 41/005; F02D 41/0065; F02D 41/222; F02D 2041/1472; F02D 2041/0075; F02D 2200/0418; F02D 2200/0402; F02D 2200/703
USPC ........................ 123/568.21, 568.22; 701/104
See application file for complete search history.

(56) References Cited

U.S. PATENT DOCUMENTS

| 5,735,245 A | 4/1998 | Kubesh |
| 8,881,713 B2 | 11/2014 | Surnilla |
| 2012/0037134 A1* | 2/2012 | Jankovic ............. F02D 41/0002 123/568.21 |

(Continued)

*Primary Examiner* — Lindsay Low
*Assistant Examiner* — George Jin
(74) *Attorney, Agent, or Firm* — Ralph E. Smith (57) ABSTRACT

A technique is provided for compensating an untrimmed oxygen ($O_2$) sensor utilized in operation of an exhaust gas recalculation (EGR) system associated with an engine. The technique includes, in one implementation, receiving a measurement from the $O_2$ sensor at a known pressure, where the $O_2$ sensor is positioned on an intake side of an engine system. Humidity compensation and pressure compensation are then determined for the $O_2$ sensor measurement, where the pressure compensation is based in part on the humidity compensation. The EGR system is controlled using the untrimmed $O_2$ sensor measurement that has been compensated for pressure and humidity.

16 Claims, 3 Drawing Sheets

(56) References Cited

U.S. PATENT DOCUMENTS

| | | | |
|---|---|---|---|
| 2013/0332050 A1* | 12/2013 | Song | F02D 41/144 701/104 |
| 2014/0014079 A1* | 1/2014 | Yacoub | F02D 41/144 123/568.16 |
| 2014/0150760 A1* | 6/2014 | Surnilla | F02B 47/08 123/568.21 |
| 2015/0051811 A1* | 2/2015 | Song | F02D 41/144 701/104 |
| 2015/0057910 A1* | 2/2015 | Surnilla | F02M 26/44 701/108 |
| 2015/0101326 A1* | 4/2015 | Surnilla | F02D 41/0052 60/599 |
| 2015/0101327 A1* | 4/2015 | Clark | F02D 41/0052 60/599 |
| 2015/0101328 A1* | 4/2015 | Surnilla | F02D 41/005 60/599 |
| 2015/0192084 A1* | 7/2015 | Surnilla | F02D 41/123 123/674 |
| 2015/0192085 A1* | 7/2015 | Surnilla | G01M 15/104 123/434 |

* cited by examiner

CONTINUOUS ADAPTATION OF AN INTAKE OXYGEN SENSOR FOR PRESSURE, HUMIDITY AND AGING

CROSS-REFERENCE TO RELATED APPLICATIONS

This application claims the benefit of U.S. Provisional Application No. 62/043,180, filed on Aug. 28, 2014. The disclosure of the above application is incorporated herein by reference in its entirety.

FIELD

The present application relates generally to exhaust gas recirculation (EGR) and, more particularly, to continuous adaptation of an untrimmed intake $O_2$ sensor for pressure, humidity and aging in connection with control of an EGR system of an engine.

BACKGROUND

Engine systems and, in particular, exhaust gas recirculation (EGR) systems typically use one or more oxygen ($O_2$) sensors for use in control of, among other features, operation of the engine and EGR system. These $O_2$ sensors are trimmed $O_2$ sensors, which provide a constant output voltage for the same $O_2$ concentration at a specific atmospheric pressure (e.g., usually 101 Kpa). The general purpose of trimming an $O_2$ sensor is to provide for all of such trimmed $O_2$ sensors manufactured by a company to have the same output voltage for the same $O_2$ concentration at the same reference pressure, which is usually atmospheric pressure. Trimmed $O_2$ sensors provide an ability to use the same calibration for controlling/reading the $O_2$ sensors. However, the trimmed $O_2$ sensors are notably more expensive than corresponding untrimmed $O_2$ sensors. Further, such trimmed $O_2$ sensors are not compensated for drifting of the sensor output as the $O_2$ sensor ages. Thus while conventional trimmed $O_2$ sensors work for their intended purpose, there remains a need for improvement in the relevant art.

SUMMARY

In accordance with an exemplary aspect of the invention, a method for use in compensating a sensor utilized in operation of an exhaust gas recirculation (EGR) system is provided. In an exemplary implementation, the method includes performing the following at a controller and/or electronic control system: receiving a measurement from an untrimmed oxygen ($O_2$) sensor at a known pressure, where the untrimmed $O_2$ sensor is positioned on an intake side of an engine system and the known pressure is determined from a pressure sensor proximate the untrimmed $O_2$ sensor; determining humidity compensation for the untrimmed $O_2$ sensor measurement; determining pressure compensation for the untrimmed $O_2$ sensor measurement, where the pressure compensation is based in part on the humidity compensation; and controlling the EGR system associated with the engine system using the untrimmed $O_2$ sensor measurement that has been compensated for pressure and humidity.

In accordance with another exemplary aspect of the invention, a system for compensating a sensor utilized in operation of an exhaust gas recirculation (EGR) system is provided. In an exemplary implementation, the system includes an engine system and a controller. The engine system includes an engine, the EGR system, a pressure sensor, a humidity sensor, and an untrimmed oxygen ($O_2$) sensor, where the untrimmed oxygen ($O_2$) sensor and the pressure sensor are positioned on an intake side of the engine system. The controller is, in one implementation, configured to: receive a measurement from the untrimmed oxygen ($O_2$) sensor at a known pressure determined form the pressure sensor; determine humidity compensation for the untrimmed $O_2$ sensor measurements utilizing input from the humidity sensor; determine pressure compensation for the untrimmed $O_2$ sensor measurement, where the pressure compensation is based in part on the humidity compensation; and control the EGR system using the untrimmed $O_2$ sensor measurement that has been compensated for pressure and humidity.

In one exemplary implementation, the controller is configured to compensate the untrimmed $O_2$ sensor measurement, which has been compensated for pressure and humidity, for aging of the untrimmed $O_2$ sensor. In this exemplary implementation, the compensation for aging includes performing the following at the controller: identifying a predetermined number of error ratio values that are furthest from a determined best fit error ratio line and discarding the identified predetermined error ratio values; receiving additional untrimmed $O_2$ sensor measurements and compensating the same for humidity and pressure; and determining a revised error ratio best fit line based on first set of values and the additional untrimmed $O_2$ sensor measurements compensated for humidity and pressure, and revised slope ($\hat{B}$) and an offset ($\hat{\alpha}$) pressure compensation factors based on the revised error ratio best fit line.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DESCRIPTION

As briefly mentioned above, the present application relates to continuous adaptation of an untrimmed intake $O_2$ sensor in connection with EGR fraction calculation and associated control of an EGR system of an engine system. In accordance with an aspect of the present application, a system and techniques are presented for compensation of an untrimmed $O_2$ sensor measurement for pressure, humidity and optionally aging. In this exemplary aspect, the untrimmed $O_2$ sensor is utilized on an intake side of the engine in connection with EGR concentration prediction. In accordance with an aspect of the present application, the technique includes a control procedure for real-time compensation of the untrimmed intake $O_2$ sensor for pressure, humidity and aging. The control procedure is configured to, in one exemplary aspect, continuously run on an engine or vehicle controller or electronic control system, which provides for the control procedure to optimize correction parameters and compensate for aging of the untrimmed $O_2$ sensor, as will be discussed in greater detail below.

An $O_2$ sensor is typically trimmed to in order to provide a constant output voltage for the same $O_2$ concentration at a specific atmospheric pressure (e.g., usually 101 Kpa). The general purpose of trimming an $O_2$ sensor is to provide for all of such trimmed $O_2$ sensors manufactured by a company to have the same output voltage for the same $O_2$ concentration at the same reference pressure, which is usually atmospheric pressure. The conventional procedure for trimming an $O_2$ sensor usually involves laser cutting a resistor inside the sensor such that the output is at a target value. Trimmed $O_2$ sensors provide an ability to use the same calibration for controlling/reading the $O_2$ sensors. However, the trimmed $O_2$ sensors are notably more expensive than corresponding untrimmed $O_2$ sensors.

As briefly mentioned above and in accordance with an aspect of the present application, the EGR system utilizes an untrimmed $O_2$ sensor on the intake air side of the engine as opposed to typical usage on the exhaust side of the engine. This provides for, among other advantages, (i) the ability to more effectively use the untrimmed $O_2$ sensor, (ii) the ability to improve EGR concentration prediction, and (iii) the ability to adapt for sensor to sensor variation and improved accuracy of the sensor output.

On the exhaust side of the engine, oxygen content is typically less than 5%, whereas on the intake air side of the engine, oxygen content can be up to approximately 21.95% (depending on the amount of EGR) and thus accuracy with use of the $O_2$ sensor on the intake side can provide a greater impact. The more accurate the $O_2$ sensor reading is, the better the EGR concentration calculation/prediction, which is a contributor to fuel economy. For example, if the $O_2$ sensor reading drifts over time due to aging, the EGR concentration calculation drifts as well, which can lead to a decrease in fuel economy.

As will be discussed in greater detail below, use of the untrimmed $O_2$ sensor in connection with the associated technique and/or control procedure of the present application provides for a more accurate sensor reading while also reducing cost as compared to a trimmed $O_2$ sensor. The engine controller and associated control strategies provide for real-time continuous adaptation of the untrimmed $O_2$ sensor for pressure and humidity factors as well as aging.

Figure 1:
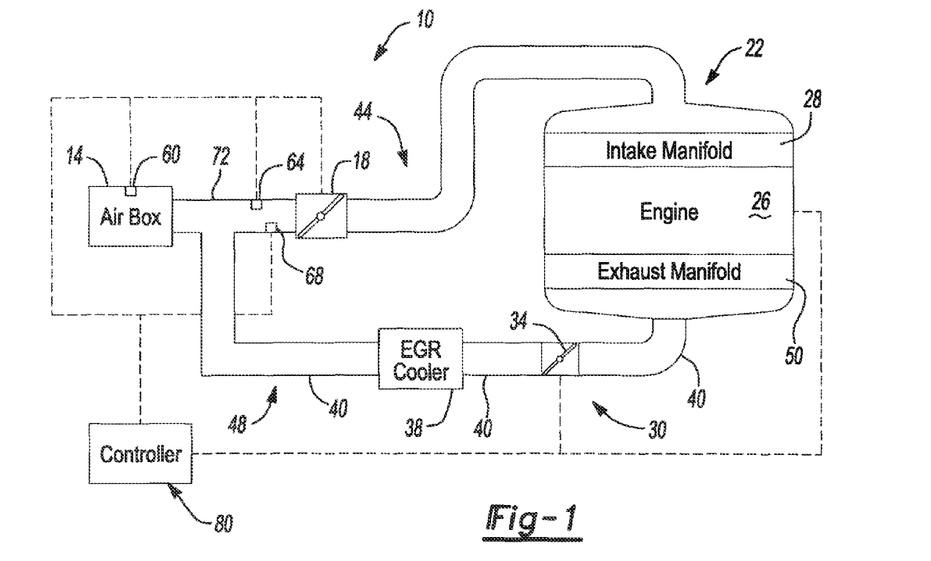
FIG. 1 is an example partial schematic diagram of an engine system according to the principles of the present disclosure.

Turning now to the drawings, an exemplary partial schematic diagram of an exemplary engine system is illustrated and generally identified at reference numeral 10. In the exemplary implementation illustrated, the engine system 10 includes, among other features and components, an intake system including an airbox 14 fluidly coupled to a throttle valve 18, which is fluidly coupled to an intake 22 of an engine 26. In one exemplary implementation, the intake 22 includes an intake manifold 28 fluidly coupled to intake ports of a cylinder head of the engine 26.

The engine system 10 also includes an exemplary EGR system 30 including, among other features, an EGR valve 34 and an EGR cooler 38, each in fluid communication via one or more fluid lines 40 with each other, an intake side 44 of the engine system 10, and an exhaust side 48 of the engine system 10. In the exemplary implementation illustrated in FIG. 1, the EGR system 30 is in fluid communication at an upstream end to an exhaust manifold 50 fluidly coupled to exhaust ports of the cylinder head of the engine 26. An opposite or downstream end of the EGR system 30 is fluidly coupled to the intake side 44 between the airbox 14 and the throttle valve 18. In this exemplary implementation and in connection with control of EGR valve 34, exhaust gas is selectively allowed to flow from engine 26 through EGR valve 34, through downstream EGR cooler 38 and to the intake side 44 downstream of airbox 14 and upstream of throttle valve 18 so as to be recirculated into the intake air stream flowing to the intake 22 of engine 26.

The engine system 10 also includes various sensors including a humidity sensor 60, an untrimmed oxygen sensor 64 and a pressure sensor 68. In the exemplary implementation illustrated, the humidity sensor 60 is associated with the airbox 14 and is configured to sense or measure the humidity of air present and/or flowing in the airbox 14. The untrimmed oxygen sensor 64 and pressure sensor 68 ear each positioned on the intake side 44 between the airbox 14 and the throttle valve 18 and are configured to sense or measure oxygen concentration and pressure, respectively, of the intake air/fluid flowing into the throttle valve 34. In the exemplary implementation illustrated, the sensors 64, 68 are positioned in a fluid line 72 between an intersection of the EGR system fluid line 40 and the throttle valve 18, as shown in FIG. 1.

As can also be seen in FIG. 1, a controller or electronic control system 80 is in communication with and controls operation of the engine system 10. In the exemplary implementation illustrated in FIG. 1, the controller 80 communicates with at least the throttle valve 18, the engine 26, the EGR valve 34, the humidity sensor 60, the untrimmed oxygen sensor 64 and the pressure sensor 68. With additional reference to FIG. 2, an example functional block diagram of the controller 80 is illustrated. The controller 80 includes a communication device 84, a processor 88, and a memory 92 including one or more buffers 96. The communication device 84 includes suitable components, e.g., a transceiver, configured to communicate with other components of the engine system 10 via a controller area network. The memory 92 is any suitable storage medium (flash, hard disk, etc.) configured to store information at the controller 80.

Figure 2:
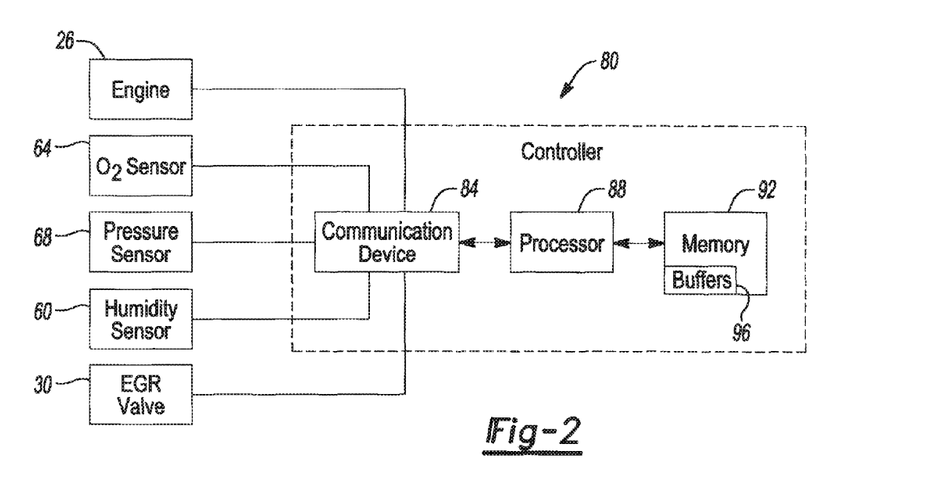
FIG. 2 is an example functional block diagram of an exemplary controller or electronic control system according to the principles of the present disclosure.

The processor 88 controls operation of the controller 80, and thus controls operation of the engine system 10. Examples of functions performed by the processor 88 include loading/executing an operating system of the controller 80, controlling transmission by and processing information received via the communication device 84, and controlling read/write operations at the memory 92. It will be appreciated that the term "processor" as used herein refers to both a single processor and two or more processors operating in a parallel or distributed architecture. The processor 88 also executes the control procedure and control techniques of the present disclosure, which are also described in greater detail below.

Figure 3:
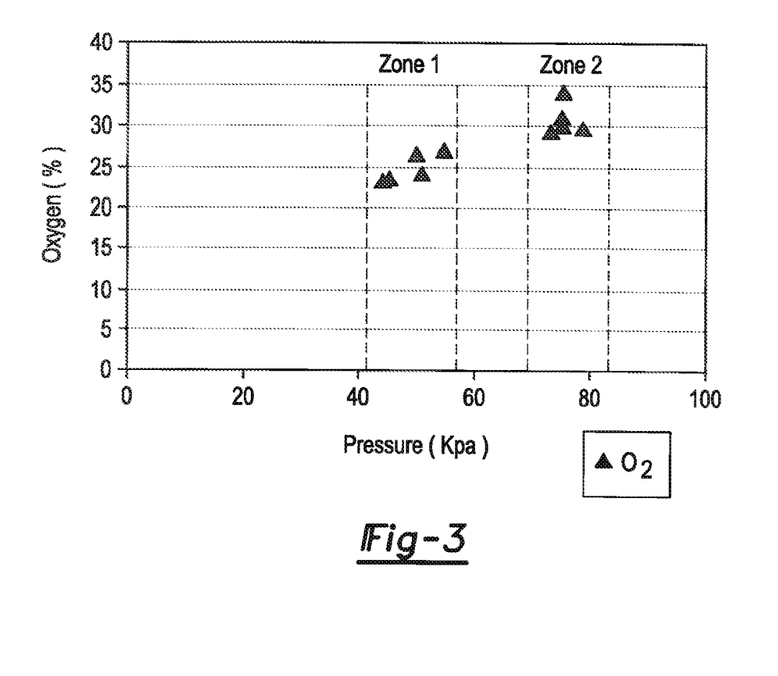
FIG. 3 is a graph illustrating untrimmed $O_2$ sensor readings associated with buffer zones of a controller, where the buffer zones include different pressure bounds in accordance with the principles of the present disclosure.

With continuing reference to FIGS. 1 and 2 and additional reference to FIG. 3, techniques for compensation of the untrimmed O₂ sensor for pressure, humidity and optionally aging will now be discussed in greater detail in connection with controlling the EGR system 30 through use of the compensated O₂ sensor measurement, which indicates how much EGR is present in the intake air stream. In other words, the compensated O₂ sensor measurement provides essentially a direct EGR measurement in connection with closed loop control of the EGR system 30.

Compensation for humidity will now be discussed in greater detail. As is generally known to those skilled in the art, fresh air intake contains humidity, which typically cannot be separated by the untrimmed O₂ sensor 64. As a result, humidity can be interpreted as exhaust gas if not properly compensated for. A compensation factor can be calculated using input from, for example, the pressure and humidity sensors, to correct the untrimmed O₂ sensor 64 reading to dry air. It will be appreciated that while the present disclosure discusses input from pressure and/or humidity sensors, the input from such sensors could alternatively be provided by calculations instead of direct sensor readings.

In one exemplary aspect, the percentage of oxygen (O₂) at a known humidity is determined, such as by using the following exemplary equation:

$$\% \ O_2(Amb) = \frac{20.95 \times \left(P_b - P_{ws} \times \frac{R_h}{100}\right)}{P_b}, \quad (1)$$

where $P_b$ is air pressure, $P_{ws}$ is vapor pressure and $R_h$ is relative humidity. The humidity correction factor, H, is then determined, such as by using the following equation:

$$H = \frac{20.95}{\% \ O_2(Amb)}. \quad (2)$$

Since the untrimmed O₂ sensor 64 output is proportional to the change in humidity, the untrimmed O₂ sensor 64 reading can be normalized to dry air. This is accomplished, for example, by multiplying the sensor output by the correction factor H, expressed as follows:

$$O_2(\text{Dry Air}) = H \times \text{Measured } O_2, \quad (3)$$

and $$V_{O_{2_{Dryair}}} = H \times V_{sense}, \quad (4)$$

where Measured O₂ is the raw measured or sensed signal in volts.

Compensation for pressure will now be discussed in greater detail. In accordance with an aspect of the present disclosure, pressure compensation includes a pressure compensation learn process and calculation of pressure compensation parameters. In one exemplary aspect, certain enable conditions must be present or met for the pressure compensation learn process. For example, sample data for the pressure compensation learn strategy can only be computed at a known O₂ concentration. Given that the only O₂ concentration that is generally known is fresh air, it is required that the engine and/or EGR systems meet certain criteria so that only fresh air is in the intake stream to the engine during this process. In one exemplary aspect of the present disclosure, the following are example enable conditions: (i) the engine 26 is running; the EGR valve 34 has been closed for a predetermined period of time; (ii) the untrimmed O₂ sensor 64 tip is at a required temperature (e.g., heated up to the required temperature); (iii) purge (of an evaporative system) is not active; and (iv) measured or sensed pressure in the intake side 44 is stable or at steady state conditions.

As discussed above, the reference O₂ sensor measurement (also termed a trimming value) is necessary to compute pressure compensation parameters. This reference measurement is taken without EGR (i.e., fresh air in intake stream) and when the pressure at the untrimmed O₂ sensor 64 location is equal to or substantially equal to the atmospheric pressure. For example, shortly after an ignition cycle, if the difference between pressure at the untrimmed O₂ sensor 64 and barometric pressure is within a predetermined tolerance, one or more pressure samples or measurement from the pressure sensor 68 are taken/received and stored as a reference pressure ($P_{ref}$) at controller 80. In one exemplary aspect, the reference pressure is an average of multiple samples. In one exemplary aspect, the reference pressure ($P_{ref}$) is stored in non-volatile RAM (NVRAM).

Shortly thereafter or in connection therewith, an untrimmed O₂ sensor 64 voltage sample or measurement is taken so long as the pressure remains within the predetermined tolerance. The untrimmed O₂ sensor 64 voltage is normalized to dry air and then stored in the buffer 96. This is accomplished, for example, by using the following exemplary equation:

$$V_{sense_i} = H \times \text{Measured Voltage} \quad (5),$$

where $V_{sense_i}$ is the voltage read at each sample taken from the untrimmed O₂ sensor 60 and the pressure sensor 68. In an effort to sparse the samples, each sample (after the initial sample) is taken after a predetermined amount of time has elapsed from the previous sample. After enough samples are acquired or the buffer 96 is filled, the average of the samples is determined and stored, such as in NVRAM, as the reference voltage. This is accomplished, in one exemplary aspect, by using the following equation:

$$V_{ref} = \frac{\sum_{1}^{i} V_{sense_i}}{i}, \quad (6)$$

where $V_{ref}$ is the reference voltage and i is the sample number.

Samples of pressure and O₂ sensor 68, 64 readings are then collected and stored, in one exemplary implementation, in two buffers 96, one for the pressure sensor 68 reading and one for the untrimmed O₂ sensor 64 reading. In accordance with an aspect of the present application, each buffer 96 can be divided into two sections, where each section represents a zone, as shown in an exemplary graphical form in FIG. 3. In one exemplary implementation, the purpose of using the zones is to separate the data points for computation of a best fit line, as will be discussed in greater detail below in connection with determination of an error ratio. In the exemplary implementation illustrated, the bounds of the zones are predefined by different high and low pressure limits. While the engine 26 is running and the above-mentioned enable conditions are present or met, voltage samples (measurements) of the untrimmed O₂ sensor 64 are taken (along with pressure samples) if the pressure falls within either of the zones. The $O_2$ voltage samples are then normalized for dry air (humidity compensation) in the manner discussed above.

In an exemplary aspect, each voltage sample is then converted to IP (pumping) current ratio, which is then converted to $O_2$ concentration and stored into the corresponding buffer 96 using, for example, the following equations:

$$\% \ IP = \frac{V_{sense} \times H - V_{Offset}}{V_{ref} - V_{Offset}}, \tag{7}$$

where % IP is the pumping current ratio of the sample to the reference, and $V_{offset}$ is the offset voltage defined by the sensor manufacturer; and $$O_{2_{Meas_i}} = \% \ IP \times <factor>, \tag{8}$$

where <factor> is a value provided by the sensor manufacturer to convert current ratio to $O_2$ percent, and $O_{2_{Meas}}$ is the measured $O_2$ normalized for dry air. Since the procedure or algorithm is running at a high execution rate, it is possible to take numerous samples within a short period of time and fill the buffer quickly. In one exemplary aspect, each sample is only taken if the change in pressure from the previous sample is greater than a predetermined value in an effort to account for this scenario. Samples are then continuously acquired until a predetermined amount and/or the buffer 96 is full.

Figure 4:
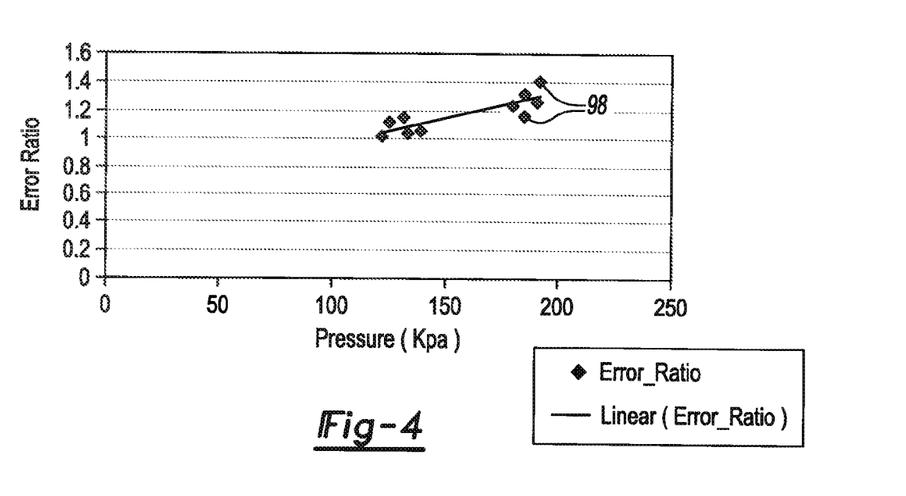
FIG. 4 is a graph illustrating error ratio as a function of pressure in connection with determining linear error ratio and discarding a predetermined number of samples in accordance with the principles of the present disclosure.

Once the buffer 96 is full and/or the predetermined amount is reached, each sample is corrected for partial pressure, such as by using the following exemplary equation:

$$O_{2_{PPCorr}} = \frac{P_{ref}}{P_{sense}} \times O_{2_{meas}}, \tag{9}$$

where $O_{2_{PPCorr}}$ is the partial pressure corrected $O_2$, and $P_{sense}$ is the sensed pressure at the sensor. An error ratio of each sample is then determined, such as by calculation using the following equation:

$$\text{Error Ratio}_i = \frac{20.95}{O_{2_{PPCorr}}}, \tag{10}$$

where Error ratio$_i$ is the error ratio of the $O_2$ sample and 20.95 is the percent $O_2$ concentration of fresh air. Next, an equation of the linear transfer function that fits the Error Ratio points is computed using, for example, the ordinary least squares method:

$$x_i: P_{sense_i}, \quad y_i: \text{Error Ratio}_i \tag{11}$$

$$S_x = \sum x_i, \ S_y = \sum y_i, \ S_{xx} = \sum x_i^2, \ S_{xy} = \sum x_i y_i,$$

$$S_{yy} = \sum y_i^2$$

$$\hat{B} = \frac{nS_{xy} - S_x S_y}{nS_{xx} - S_x^2}, \quad \hat{\alpha} = \frac{1}{n} S_y - \hat{B} \frac{1}{n} S_x,$$

where $\hat{\alpha}$ is the Offset of the Error Ratio line stored to NV (non volatile) RAM, and $\hat{B}$ is the Slope of Error Ratio line stored to NV RAM, and where the best fit line of the error ratio points associated with the slope and offset is graphically shown in FIG. 4.

To compensate for pressure, the following pressure compensation parameters and equations are then used in accordance with an exemplary aspect of the present disclosure:

$$P_{ref}, V_{ref}, \hat{\alpha}, \hat{B} \tag{12}$$

$$\% \ IP = \frac{V_{sense} - V_{Offset}}{V_{ref} - V_{Offset}} \quad \text{Step 1}$$

$$O_{2_{meas}} = \% \ IP \times <factor> \quad \text{Step 2}$$

$$O_{2_{PPCorr}} = \frac{P_{ref}}{P_{sense}} \times O_{2_{meas}} \quad \text{Step 3}$$

$$O_{2_{Corr}} = O_{2_{PPCorr}} \times (\hat{\alpha} + \hat{B} \times P_{sense}) \quad \text{Final Step}$$

OR $$O_{2_{Corr}} = \frac{P_{ref}}{P_{sense}} \times \frac{V_{sense} - V_{Offset}}{V_{ref} - V_{Offset}} \times (\hat{\alpha} + \hat{B} \times P_{sense}),$$

where $O_{2_{Corr}}$ is the final corrected $O_2$ measurement. This corrected $O_2$ measurement includes compensation for pressure and humidity.

As briefly mentioned above, the control procedure and control strategy for the untrimmed $O_2$ sensor(s) 64 utilized in the engine system 10 in connection with control thereof (including control of the EGR system) can also provide for age adaptation (discussed in more detail below) and compensation optimization. In accordance with an aspect of the present application, this can be accomplished through continuous learning in connection with the algorithm or control procedure continuously calculating or determining the parameters discussed above (in an engine or other vehicle controller or control system) and preserving at least a portion of the samples that were used to calculate those parameters. For example, a predetermined percentage, such as 20% of the samples can be removed from the buffer 96, such as the samples that are furthest from the trend line. These removed samples are then replaced with new samples, as discussed in greater detail below.

With general reference to FIG. 4 and in one exemplary aspect of the present disclosure, the farthest 20% of the samples from the linear trend line are calculated or determined. This is accomplished in one exemplary aspect by calculating the distance from the trend line at each pressure using, for example, a linear equation of the error ratio:

Point On Line=Pressure×$\hat{B}$+$\hat{\alpha}$

Distance From Line=absolute(Error$_{Ratio}$−Point On Line) (13).

The calculated values can then be sorted or organized in a manner so as to identify the first 20% of the samples from the pressure and $O_2$ buffer 96 that are furthest from the trend line (e.g., samples 98 illustrated in FIG. 4). New samples can then be acquired in the manner discussed above to fill this portion of the buffer 96. The process for calculating the error line is then repeated until the predetermined amount is reached and/or the buffer 96 is full.

In one exemplary implementation, this process is repeated or runs continuously on the controller and/or control system 80. After a relatively short amount of learns, the buffer 96 will contain points that are closer to the trend line. As the untrimmed O₂ sensor 64 drifts with aging, the trend line will do the same and thus provides for accurate O₂ correction regardless of (or taking into account) untrimmed O₂ sensor 64 aging. In one exemplary aspect, initial learned parameters are retained in EEProm, while subsequently learned parameters are stored in NVRAM. In this exemplary aspect, after every parameter learning, the learned value is compared to the initial learned value in EEProm and is only allowed to be accepted if it is within a predetermined tolerance. The buffers 96 are cleared in connection with each ignition cycle.

Figure 5:
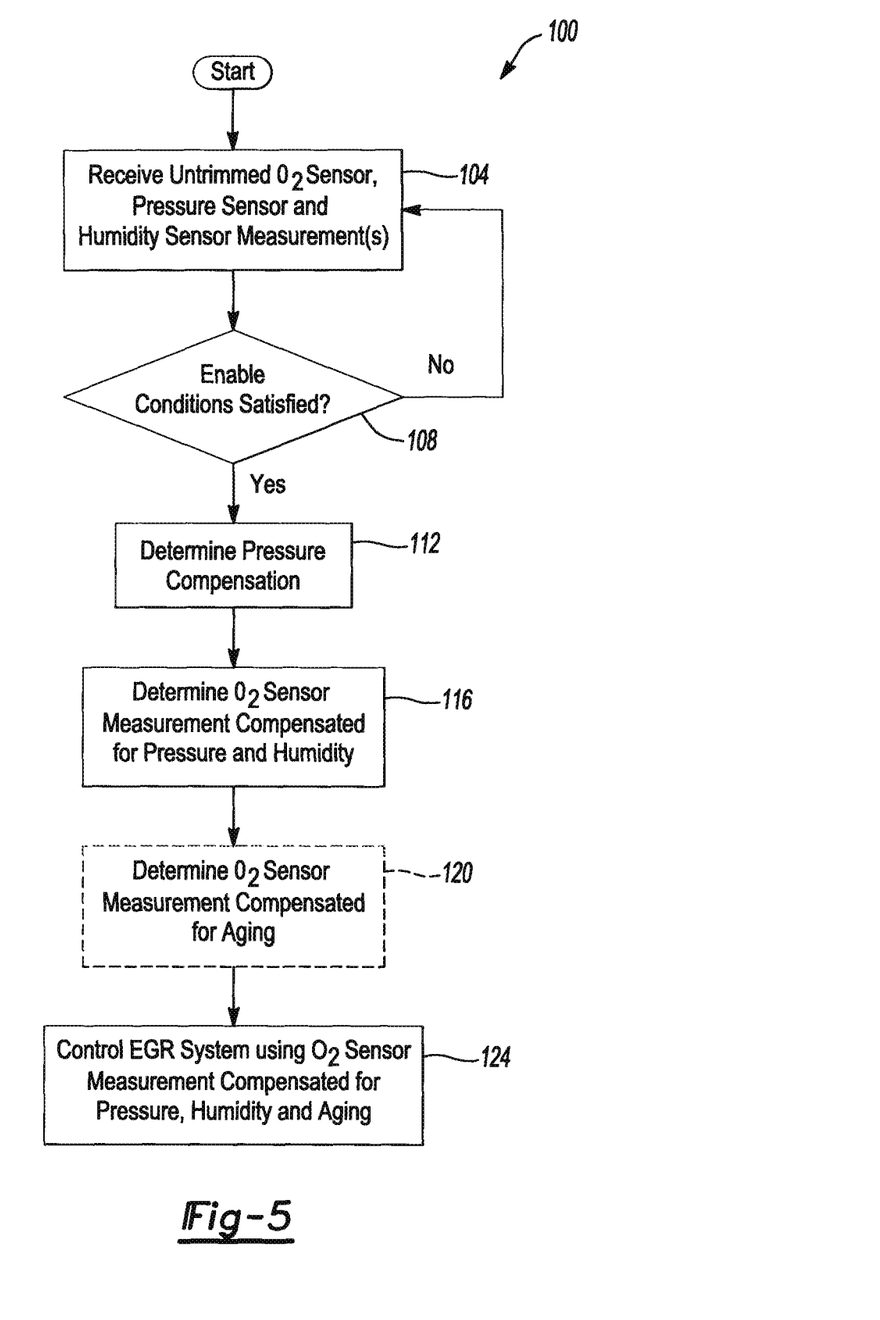
FIG. 5 is an example flow diagram of a method of adapting or compensating an untrimmed intake $O_2$ sensor for pressure, humidity and/or aging in connection with controlling an EGR system according to the principles of the present disclosure.

Referring now to FIG. 5, an example flow diagram of a method 100 for compensating an untrimmed O₂ sensor 64 for humidity, pressure and aging in connection with control of the EGR system 30 is illustrated. At 104, the controller 80 receives one or more readings or measurements from the untrimmed O₂ sensor 64, pressure sensor 68, and/or humidity sensor 60 at a known O₂ concentration and pressure. At 108, the controller determines if enable conditions are satisfied for pressure compensation, as discussed above, because a steady or stable pressure at the untrimmed O₂ sensor 64 location and fresh air in the intake air stream are required.

At 112, the controller 80 determines pressure compensation for the untrimmed O₂ sensor 64 using pressure compensation parameters. As discussed above, the reference untrimmed O₂ sensor measurement is required for pressure compensation and is determined from samples taken when the pressure at the untrimmed O₂ sensor 64 location is equal to atmospheric pressure and is stored in NVRam. The reference pressure measurement is also determined and stored at controller 80 in the manner discussed above.

Various O₂ sensor and corresponding pressure samples or measurements are then taken and stored at controller 80 in the manner discussed above until the buffer 96 is full and/or a predetermined number of samples is acquired. Each sample is converted into an O₂ concentration and stored in the buffer 96. Once the buffer is full or the predetermined number of samples has been acquired, each sample is compensated for humidity, corrected for partial pressure and then the error ratio is determined in the manner discussed above. A linear equation that best fits the error ratio points is then determined, yielding the pressure compensation offset and slope parameters ($\hat{\alpha}$, $\hat{B}$) to be used with the pressure compensation parameters ($P_{ref}$, $V_{ref}$) as discussed above in connection with pressure compensation equation (12). At 116, the controller determines the O₂ sensor measurement compensated for pressure and humidity using equation (12).

Optionally, at 120, the controller 80 adapts or compensates the untrimmed O₂ sensor measurement that has already been compensated for pressure and humidity in the manner discussed above. Therefore, as the untrimmed O₂ sensor (readings) drift with aging, the determined trend line discussed above will do the same, which provides for accurate O₂ sensor pressure and humidity compensation regardless of the age of the sensor. At 124, the controller 80 controls the EGR system 30 using the O₂ sensor measurement compensated for pressure, humidity and optionally aging. For example, the compensated untrimmed O₂ sensor reading indicates how much EGR is present in the intake air stream, which is used in connection with operation and control of the engine system 10 to control the EGR valve 34 and thus the amount of exhaust gas to be recirculated back into the intake air stream.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above. It should also be understood that the description, including disclosed examples and drawings, is merely exemplary in nature intended for purposes of illustration only and is not intended to limit the scope of the present disclosure, its application or uses. Thus, variations that do not depart from the gist of the present disclosure are intended to be within the scope of the present disclosure.

What is claimed is:

1. A method for use in compensating a sensor utilized in operation of an exhaust gas recirculation (EGR) system, the method comprising:
    receiving, at a controller of an engine system, the controller having one or more processors, a measurement from an untrimmed oxygen (O₂) sensor at a known pressure, the untrimmed O₂ sensor positioned on an intake side of the engine system;
    determining, at the controller, humidity compensation for the untrimmed O₂ sensor measurement;
    determining, at the controller, pressure compensation for the untrimmed O₂ sensor measurement, the pressure compensation based in part on the humidity compensation; and
    controlling, by the controller, the EGR system associated with the engine system using the untrimmed O₂ sensor measurement that has been compensated for pressure and humidity;
    wherein determining the pressure compensation includes determining, at the controller, the untrimmed O₂ sensor measurement compensated for pressure and humidity ($O_{2_{Corr}}$) as:

$$O_{2_{Corr}} = \frac{P_{ref}}{P_{sense}} \times \frac{V_{sense} - V_{Offset}}{V_{ref} - V_{Offset}} \times (\hat{\alpha} + \hat{B} \times P_{sense}),$$

where $P_{ref}$ represents a reference pressure determined at the controller, $P_{sense}$ represents each of the plurality of pressure measurements for each untrimmed O₂ sensor measurement, $V_{sense}$ represents each of a plurality of untrimmed O₂ sensor measurements in terms of voltage, $V_{ref}$ represents a reference voltage of the untrimmed O₂ sensor determined by the controller, $V_{offset}$ represents an offset voltage associated with the untrimmed O₂ sensor, and $\hat{B}$ and $\hat{\alpha}$ represent the respective slope and offset of a best fit error ration line of the plurality of untrimmed O₂ sensor measurements.

2. The method of claim 1, further comprising determining, at the controller, whether the following enable conditions are satisfied prior to determining the pressure compensation: i) an intake air stream contains only fresh air, and ii) a pressure of the intake air stream at a location of the untrimmed O₂ sensor is substantially steady.

3. The method of claim 2, wherein determining whether the intake air stream includes only fresh air includes determining whether: i) an EGR valve of an EGR system associated with the engine has been closed for a predetermined period of time; ii) the untrimmed O₂ sensor is above a predetermined temperature; and iii) a purge operation of an evaporative system associated with the engine system is not active.

4. The method of claim 2, wherein determining pressure compensation for the untrimmed O₂ sensor measurement includes:

receiving, at the controller, the plurality of untrimmed O₂ sensor measurements and corresponding pressure measurements from a pressure sensor proximate the untrimmed O₂ sensor;

compensating, at the controller, each of the plurality of untrimmed O₂ sensor measurements for humidity;

compensating, at the controller, each of the of the plurality of untrimmed O₂ sensor measurements, which have already been compensated for humidity, for partial pressure;

determining, at the controller, an error ratio for each of plurality of untrimmed O₂ sensor measurements that have been compensated for humidity and partial pressure and storing the determined error ratio as a first set of values at the controller; and determining, at the controller, pressure compensation factors based on the determined error ratio for each of plurality of untrimmed O₂ sensor measurements.

5. The method of claim 4, wherein determining pressure compensation factors based on the error ratio for each of plurality of untrimmed O₂ sensor measurements includes determining, at the controller, the best fit error ratio line of the first set of values using an ordinary least square estimation method, where the error ratio line includes the slope ($\hat{B}$) and the offset ($\hat{\alpha}$).

6. The method of claim 5, further comprising compensating, at the controller, the untrimmed O₂ sensor measurement, which has been compensated for pressure and humidity, for aging of the untrimmed O₂ sensor.

7. The method of claim 6, wherein compensating the untrimmed O₂ sensor for aging includes:

identifying, at the controller, a predetermined number of error ratio values that are furthest from the determined best fit error ratio line and discarding the identified predetermined error ratio values;

receiving, at the controller, additional untrimmed O₂ sensor measurements and compensating the same, at the controller, for humidity and pressure; and determining, at the controller, a revised error ratio best fit line based on first set of values and the additional untrimmed O₂ sensor measurements compensated for humidity and pressure, and revised slope ($\hat{B}$) and offset ($\hat{\alpha}$) pressure compensation factors based on the revised error ratio best fit line.

8. The method of claim 7, further comprising controlling, by the controller, the EGR system using the untrimmed O₂ sensor measurement that has been compensated for pressure, humidity and aging of the untrimmed O₂ sensor.

9. A system for compensating a sensor utilized in operation of an exhaust gas recirculation (EGR) system, the system comprising:

an engine system including an engine, the EGR system, a pressure sensor, a humidity sensor, and an untrimmed oxygen (O₂) sensor, the untrimmed O₂ sensor and pressure sensor positioned on an intake side of the engine system; and a controller configured to:

receive a measurement from the untrimmed O₂ sensor at a known pressure determined from the pressure sensor;

determine humidity compensation for the untrimmed O₂ sensor measurements utilizing input from the humidity sensor;

determine pressure compensation for the untrimmed O₂ sensor measurement, the pressure compensation based in part on the humidity compensation; and control the EGR system using the untrimmed O₂ sensor measurement that has been compensated for pressure and humidity;

wherein determining the pressure compensation includes determining, at the controller, the untrimmed O₂ sensor measurement compensated for pressure and humidity ($O_{2_{Corr}}$) as:

$$O_{2_{Corr}} = \frac{P_{ref}}{P_{sense}} \times \frac{V_{sense} - V_{Offset}}{V_{ref} - V_{Offset}} \times (\hat{\alpha} + \hat{B} \times P_{sense}),$$

where $P_{ref}$ represents a reference pressure determined at the controller, $P_{sense}$ represents each of the plurality of pressure measurements for each untrimmed O₂ sensor measurement, $V_{sense}$ represents each of a plurality of untrimmed O₂ sensor measurements in terms of voltage, $V_{ref}$ represents a reference voltage of the untrimmed O₂ sensor determined by the controller, $V_{offset}$ represents an offset voltage associated with the untrimmed O₂ sensor, and $\hat{B}$ and $\hat{\alpha}$ represent the respective slope and offset of a best fit error ration line of the plurality of untrimmed O₂ sensor measurements.

10. The system of claim 9, wherein the controller is further configured to determine whether the following enable conditions are satisfied prior to determining the pressure compensation: i) an intake air stream associated with the intake side of the engine system contains only fresh air, and ii) a pressure of the intake air stream at a location proximate the untrimmed O₂ sensor is substantially steady.

11. The system of claim 10, wherein the controller is further configured to determine whether the intake air stream includes only fresh air by determining: i) an EGR valve of an EGR system has been closed for a predetermined period of time; ii) the untrimmed O₂ sensor is above a predetermined temperature; and iii) a purge operation of an evaporative system associated with the engine system is not active.

12. The system of claim 10, wherein the controller is further configured to determine pressure compensation for the untrimmed O₂ sensor measurement by:

receiving the plurality of untrimmed O₂ sensor measurements and corresponding pressure measurements from a pressure sensor proximate the untrimmed O₂ sensor;

compensating each of the plurality of untrimmed O₂ sensor measurements for humidity;

compensating each of the of the plurality of untrimmed O₂ sensor measurements, which have already been compensated for humidity, for partial pressure;

determining an error ratio for each of plurality of untrimmed O₂ sensor measurements that have been compensated for humidity and partial pressure and storing the determined error ratio as a first set of values at the controller; and determining pressure compensation factors based on the determined error ratio for each of plurality of untrimmed O₂ sensor measurements.

13. The system of claim 12, wherein the controller is further configured to determine pressure compensation factors based on the error ratio for each of plurality of untrimmed O₂ sensor measurements by determining the best fit error ratio line of the first set of values using an ordinary least square estimation method, where the error ratio line includes the slope ($\hat{B}$) and the offset ($\hat{\alpha}$).

14. The system of claim 13, wherein the controller is further configured to compensate the untrimmed O₂ sensor measurement, which has been compensated for pressure and humidity, for aging of the untrimmed O₂ sensor.

15. The system of claim 14, wherein the controller is further configured to compensate the untrimmed $O_2$ sensor for aging by:
- identifying a predetermined number of error ratio values that are furthest from the determined best fit error ratio line and discarding the identified predetermined error ratio values;
- receiving additional untrimmed $O_2$ sensor measurements and compensating the same, at the controller, for humidity and pressure; and
- determining, at the controller, a revised error ratio best fit line based on first set of values and the additional untrimmed $O_2$ sensor measurements compensated for humidity and pressure, and revised slope ($\hat{B}$) and offset ($\hat{\alpha}$) pressure compensation factors based on the revised error ratio best fit line.

16. The system of claim 15, wherein the controller is configured to control the EGR system using the untrimmed $O_2$ sensor measurement that has been compensated for pressure, humidity and aging of the untrimmed $O_2$ sensor.

\* \* \* \* \*